United States Patent [19]

Imaizumi et al.

[11] 4,058,681
[45] Nov. 15, 1977

[54] INFORMATION TRANSMISSION SYSTEM

[75] Inventors: Yoshihiro Imaizumi; Yoshihiko Nishida, both of Kawasaki, Japan

[73] Assignee: Fuji Electric Co., Ltd., Kawasaki, Japan

[21] Appl. No.: 708,442

[22] Filed: July 23, 1976

[30] Foreign Application Priority Data

July 26, 1975 Japan .................................. 50-91395

[51] Int. Cl.² .............................................. H04J 6/02
[52] U.S. Cl. ................................ 179/15 AL; 178/2 D
[58] Field of Search ................... 179/15 AL; 178/2 R, 178/2 C, 2 D, 2 E; 340/147 LP

[56] References Cited
U.S. PATENT DOCUMENTS

| 3,564,145 | 2/1971 | Deutsch et al. | 179/15 AL |
| 3,597,549 | 8/1971 | Farmer et al. | 178/2 D |
| 3,732,543 | 5/1973 | Rocher et al. | 179/15 AL |
| 3,742,148 | 6/1973 | Ledeen et al. | 179/15 AL |
| 3,932,841 | 1/1976 | Deerfield et al. | 179/15 AL |

Primary Examiner—Thomas A. Robinson
Attorney, Agent, or Firm—Sughrue, Rothwell, Mion, Zinn and Macpeak

[57] ABSTRACT

An information transmission network in which a plurality of information processing stations are connected in parallel to a bus line is disclosed. Each station has a communication control means and an information processor. Each control means is capable of establishing command over the bus line to the exclusion of all other stations. While command is established, the commanding station can communicate with all other stations. After one sequence of communication, command is transferred. If the station presently in command fails, the failure to transfer command in a predetermined time will be noted and another station with highest priority will assume command. If the station to which command is transferred is not operating properly, the station presently in command will detect a failure of the former station to respond to transfer of command and will thereupon transfer command to another station.

4 Claims, 6 Drawing Figures

INFORMATION TRANSMISSION SYSTEM

BACKGROUND OF THE INVENTION

This invention relates to an information transmission system wherein a plurality of information processing apparatuses distributed over a wide area are connected in parallel with each other via a commonly provided information transmitting bus line, and information is arbitrarily transmitted between these information processing apparatuses.

In the case where a plurality of information processing apparatuses are distributed over a comparatively wide area so that each of the apparatuses is separated from others by comparatively long distances, interconnection of all the information processing apparatuses through separate transmission lines is not economical because such an arrangement not only requires a greater amount of transmission lines but also requires the provision of a plurality of information transmitting devices in each apparatus. To eliminate the latter disadvantage of the above described arrangement, there has been proposed an information transmitting system of the type shown in FIG. 1, wherein a plurality of information processing apparatuses, 1 through N, are connected in parallel with a common information transmitting bus line CL. Under the control of a bus line control device LC, information transmission between these apparatuses is arbitrarily carried out over the bus line CL.

However, such an information transmitting system requires a bus line control device, LC, capable of supervising and controlling the bus line against duplicate use of the bus line, and any trouble in the bus line control device, LC, tends to cause a total failure of the information transmitting system. For this reason, the bus line control device LC is made of high precision circuits operable in a multiplex manner, thus requiring a high cost of manufacture.

SUMMARY OF THE INVENTION

The object of the present invention is to provide a novel information transmitting system wherein a common information transmitting bus line is used without requiring a costly bus line control device, information transmission can be achieved between any of the plurality of information processing apparatuses, and any possibility of causing total failure of the system by a single error can be eliminated.

For the achievement of the above-mentioned object, the information transmission system according to this invention is characterized in that each of the information processing apparatuses is provided with means capable of establishing a command over the information transmitting bus line. Under such command information is transmitted between the same information processing apparatus, now establishing command, and another information processing apparatus. After the termination of the information transmission, the command of the information transmitting bus line is sequentially transferred from the apparatus having established command over the information transmitting bus line to other information processing apparatuses.

DETAILED DESCRIPTION OF THE INVENTION

Figure 1:
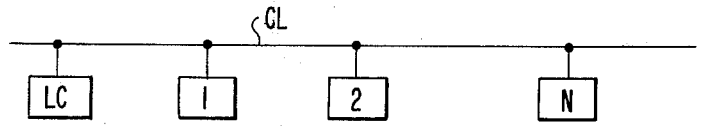
FIG. 1 is a block diagram showing the construction of a conventional information transmission system.
Figure 2:
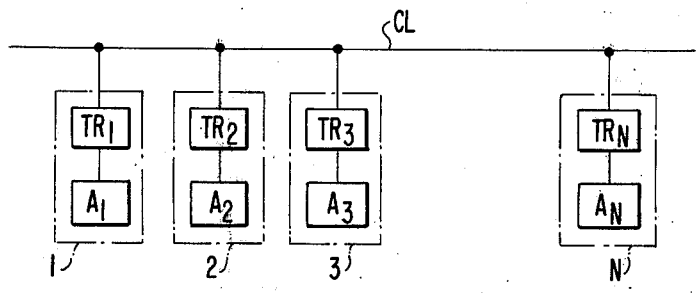
FIG. 2 is a block diagram showing the construction of the information transmission system according to the present invention.

FIG. 2 is a block diagram showing the basic construction of the invention. In the figure, 1 through N designate information processing apparatuses comprising respectively communication controls TR1 through TRN, each having a bi-directional communication function, and information processing portions $A_1$ through $A_N$. The apparatuses are connected in parallel through the communication controls $TR_1$ through $TR_N$ with a commonly provided information transmitting bus line CL. The communication control TR of each information processing apparatus functions not only to transmit information between the information processing portion A and the bus line CL, but also to establish command over the bus line. When the communication control means TR establishes command over the bus line CL, it delivers, by the request of information processing portion A, an information transmitting instruction toward another information processing apparatus, and actively operates to transmit and receive information for the information processing portion A. When the communication control means TR does not establish command over the bus line, it obeys the instruction from another information processing apparatus which establishes command over the bus line and passively operates in transmitting and receiving information for the information processing portion A. The information processing apparatuses are assigned with their own addresses 1 through N, respectively, and when a communication control means TR transmits information over the bus line CL, an address designating the destined information processing apparatus is added to the information. When the communication control TR receives information from the bus line CL, it selectively receives information having an address assigned to it.

One example of the information transmitting procedure in the system according to this invention is indicated in FIG. 3.

Figure 3A:
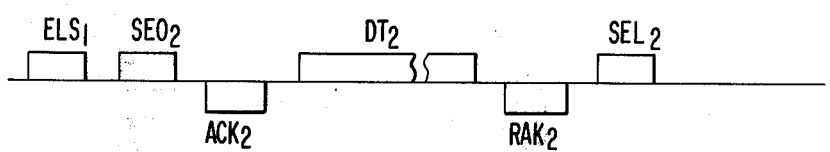
FIG. 3a is a time chart showing signals present on the bus line when station 1 in FIG. 2 has established command.

It is first assumed that the communication control means $TR_1$ of the No. 1 information processing apparatus 1 establishes command over the bus line CL. This is realized by a command establishing signal $ELS_1$ delivered from the communication control means $TR_1$ over the bus line as shown in FIG. 3a. The communication control means TR of the other information processing apparatuses reset their own command establishing devices thereby to prevent duplicated establishment of command over the bus line. In the case where the information processing portion $A_1$ of the information processing apparatus 1 has data $DT_2$ to be transmitted to the information processing apparatus 2, the communication control means $TR_1$ delivers a transmission request signal $SEQ_2$ including the address 2 of the information processing apparatus 2. Upon receiving the transmission request signal $SEQ_2$, the communication control means $TR_2$ of the information processing apparatus 2 detects that the signal is directed to its own apparatus 2, and when the apparatus 2 is in a receivable state, the communication control means $TR_2$ delivers a reception ready signal $ACK_2$ over the bus line. When the communication control means $TR_1$ receives the reception ready signal $ACK_2$ from $TR_2$, it reads out the data $DT_2$ from the information processing portion $A_1$ and transmits the same through the bus line to the information processing apparatus 2. The communication control $TR_2$ of the apparatus 2 receives the data $DT_2$ and checks for errors to confirm the correctness of the received data. When the confirmed data is written into the information processing portion $A_2$ of the apparatus 2, the communication control means $TR_2$ delivers a reception completion signal $RAK_2$ over the bus line CL. When the communication control $TR_1$ receives the reception completion signal $RAK_2$, a series of data transmission procedures terminates. The communication control means $TR_1$ thus terminates the data transmission, then transfers the command of the bus line in accordance with a predetermined sequential order or utterly arbitrarily to, for instance, the information processing apparatus 2 by sending a command transferring signal $SEL_2$. Simultaneously, the command establishing device in the communication control means $TR_1$ is reset.

Figure 3B:
FIG. 3b is a time chart showing the signals present on the bus line when station 2 in FIG. 2 has established command.

The communication control means $TR_2$ of the apparatus 2, upon reception of the command transferring signal $SEL_2$, sets the command establishing device and then delivers a command establishing signal $ELS_2$ as shown in FIG. 3b over the bus line CL. The command of the bus line by the communication control means $TR_2$ is thus established. However, if there is no demand for data transmission in the information processing apparatus 2, the communication control means $TR_2$ immediately delivers a command transfer signal $SEL_3$ to the communication control means $TR_3$ of the apparatus 3.

Figure 3C:
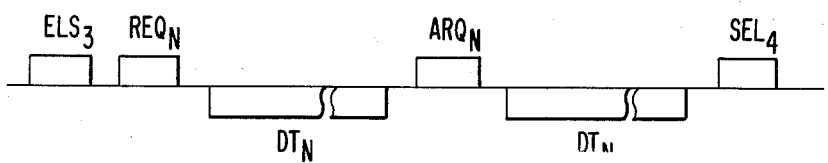
FIG. 3c is a time chart showing signals present on the bus line when station 3 in FIG. 2 has established command.

Upon reception of the command transfer signal $SEL_3$, the communication control means $TR_3$ sets the command establishing device and delivers a command establishing signal $ELS_3$ as shown in FIG. 3c over the bus line CL. When the apparatus 3 has a demand to read out the data in the information processing apparatus N, the communication control $TR_3$ delivers a reception request signal $REQ_N$ directed to the communication control $TR_N$ of the apparatus N over the bus line. When the apparatus N is in a transmissible state, the communication control means $TR_N$ which has received the reception request signal $REQ_N$, immediately reads out the data $DT_N$ stored in the information processing portion $A_N$ and transmits the same to the communication control means $TR_3$. The communication control means $TR_3$ receives the data $DT_N$, checks for error, and if any error is found, delivers a reception reclaiming signal $ARQ_N$ toward the communication control means $TR_N$. The communication control means $TR_N$ thus retransmits the data $DT_N$, and when the data $DT_N$ is correctly received by the communication control means $TR_3$, the data is transferred into the information processing portion $A_3$, and the series of data transmitting operations terminates. The communication control means $TR_3$ resets its own command establishing device and delivers a command transferring signal $SEL_4$ toward the subsequent information processing apparatus 4.

From the above description, it will be apparent that information transmission can be carried out between any arbitrary pair of information processing apparatuses by repeating the above described procedures.

Figure 4:
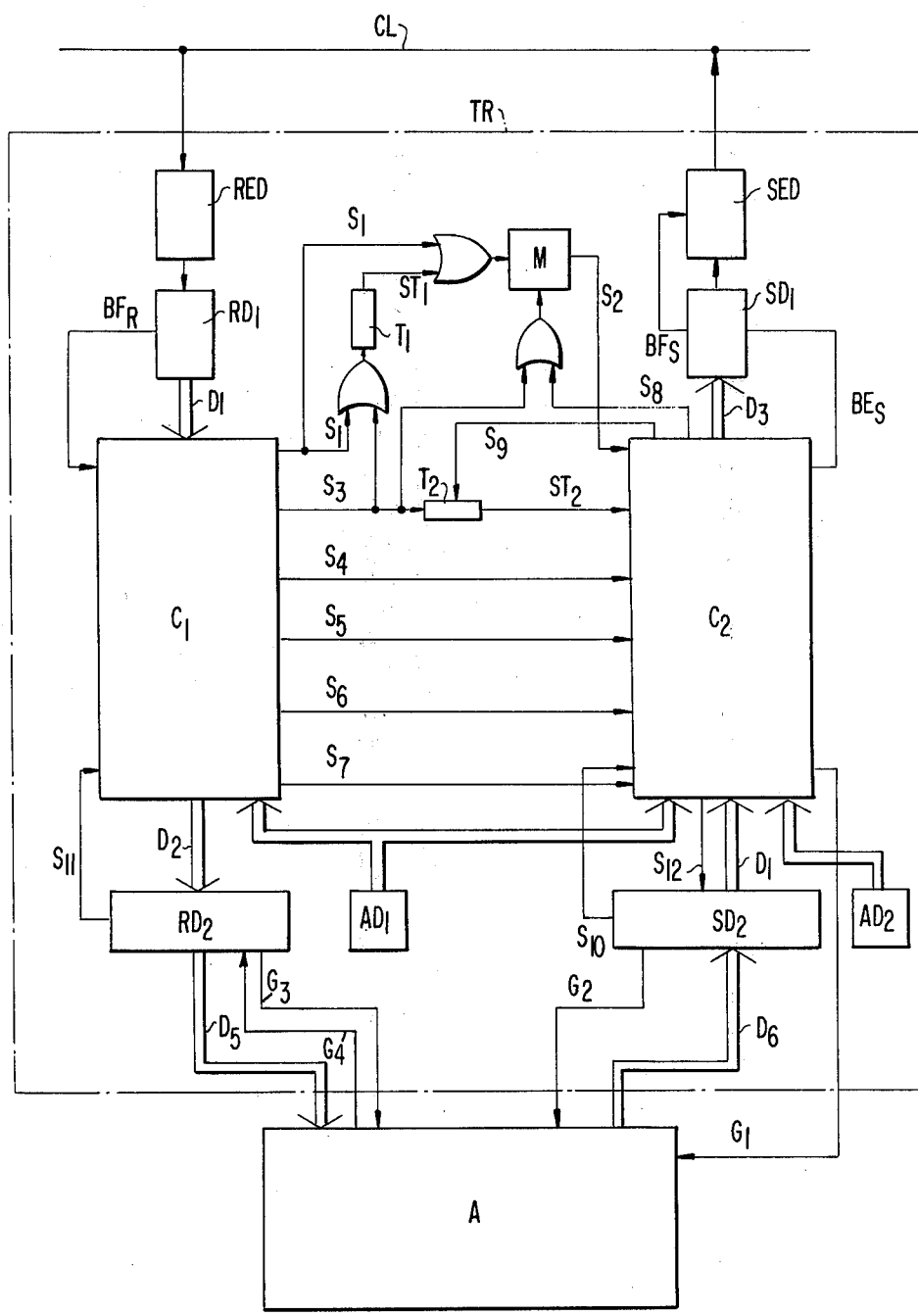
FIG. 4 is a block diagram showing a concrete example of the information processing apparatus according to this invention.

In FIG. 4, an example of the communication control means included in each information processing apparatus is indicated in block diagram form, where each block represents a known device. In the drawing, CL designates the commonly provided information transmitting bus line, A the information processing portion, and TR the communication control means connected with the information processing portion A through data lines $D_5$ and $D_6$ and control lines $G_1$ through $G_4$. The communication control TR has a receiver RED and a transmitter SED both connected directly to the common bus line CL. When it is required, the receiver RED and the transmitter SED can modulate and demodulate the related signals. The output side of the receiver RED is connected with a receiving register $RD_1$ made of a shift register for the series-parallel conversion of the output signal. More specifically, when the register $RD_1$ stores one word or one block of information having a predetermined number of bits, it delivers a buffer-full signal $BF_R$ toward a reception control device $C_1$ thereby to report the reception of information. Upon reception of the buffer-full signal $BF_R$, the reception control device $C_1$ reads out the data stored in the register $RD_1$ in parallel, and carries out interpretation and error check operations on the data. The reception control device $C_1$ further generates various control signals depending on the results of such operations, and sends these signals to a command establishing device M, timers $T_1$ and $T_2$, a transmission control device $C_2$, and a received data buffer register $RD_2$.

The transmission control device $C_2$ delivers various control data in accordance with the control signals from the reception control device $C_1$, command establishing device M, timers $T_1$ and $T_2$, and adds an address of destination to the data read out of a transmission data buffer register, the resultant data being delivered in parallel to a transmitting register $SD_1$ which is made of a shift register to effectuate parallel-series conversion on the resultant data. When the data is stored in the transmitting register $SD_1$, the same register delivers a buffer-full signal $BF_S$ causing the transmitter SED to read out the data bit by bit in series from the register $SD_1$ and to transmit the data over the bus line CL.

Furthermore, $AD_1$ designates an own address setting device, and $AD_2$ designates a subsequent address setting device which sets the address of an information processing apparatus to which the command for controlling the bus line is to be transferred. The times $T_1$ and $T_2$ are provided for supervising the bus line for the purpose of preventing interruption of data transmission due to the fault of the communication control presently having command or the communication control to which the command is to be transferred.

The operation of the communication control is as follows.

When a command transfer signal SEL is delivered to the bus line CL from the communication control means of the apparatus presently having command over the bus line, receivers RED in the communication control means TR of all the information processing apparatuses receive the command transfer signal SEL and store the same in their receiving registers $RD_1$. When the receiving register $RD_1$ stores a predetermined number of bits of the signal, a buffer-full signal $BF_R$ is delivered to the reception control device $C_1$. Upon reception of the buffer-full signal, the reception control device $C_1$ starts to operate to read out the data stored in the register $RD_1$, to interpret the control signals included in the data, and to compare the address attached to the data with its own address. As a result, the reception control device $C_1$ in the communication control means whose address coincides with the address attached to the data SEL delivers a command setting signal $S_1$ to the input of the command establishing device M. The command establishing device M is thereby set, and the communication control means TR of the information processing apparatus establishes command over the bus line.

Setting of the command establishing device M causes it to deliver a signal $S_2$ toward the transmission control device $C_2$ thereby to instruct the transmission of a command establishing signal ELS, having its own address attached thereto, which is given by the own address setting device $AD_1$. The transmission control device $C_2$ effectuates the address attaching operation, and the resultant signal is sent through the data line $D_3$ to the transmission register $SD_1$ under the condition of the register $SD_1$ being still vacant. When the signal is stored in the transmission register $SD_1$ and a buffer-full signal $BF_S$ is delivered to the transmitter SED, the latter starts to operate thereby transmitting the signal stored in the register $SD_1$ bit by bit in series over the information transmitting bus line CL. By the transmission of the signal ELS attached with the address of the information processing apparatus, the fact that the communication control means TR has established command over the bus line CL is reported to the communication control means TR of all the other information processing apparatuses.

When the command establishing signal ELS from the communication control TR of the information processing apparatus now establishing command over the bus line is received in all the remaining information processing apparatuses through the receiver RED and the receiving register $RD_1$, the reception control device $C_1$ delivers a signal $S_3$ to reset the command establishing device M because the address attached to the signal ELS does not coincide with its own address. At this time, in the communication control TR means of the information processing apparatus now having established command, the reception control device $C_1$ does not deliver the signal $S_3$ and the command establishing device M is held in the set state. Thus, the communication control TR from which the command establishing signal ELS is delivered acquires the command of the transmission bus line CL and can operate actively to control the bus line.

After the transmission of the command establishing signal ELS from the communication control means TR, the transmission register $SD_1$, now in a vacant state, delivers a buffer empty signal $BE_S$. Upon reception of the buffer empty signal $BE_S$, the transmission control device $C_2$ surveys the existence or nonexistence of data in a transmitting data buffer register $SD_2$ depending on the state of a data existence indicating signal $S_{10}$. In the transmitting data buffer register $SD_2$, data from the information processing portion A, when such a demand exists in the portion A, has been sent through a data line $D_6$ together with the address of the destined information processing apparatus and stored therein. When the data buffer register $SD_2$ stores such data, it delivers the signal $S_{10}$ in the "1" state, and when it does not store such data it delivers the signal $S_{10}$ in the "0" state. Now it is assumed that data from the information processing portion A is stored in the buffer register $SD_2$, and the signal $S_{10}$ is in the "1" state. The transmission control device $C_2$ knows of the existence of such data from the "1" state of the signal $S_{10}$ and instantaneously reads out the address of the destined information processing apparatus stored in the buffer register $SD_2$ together with the data to be transmitted. The control device $C_2$ further attaches this address to a transmission request signal SEQ and sends out the resultant signal to the transmission register $SD_1$ through the data line $D_3$. The transmitter SED transmits the signal in the transmission register $SD_1$ over the transmission bus line CL.

The reception control device $C_1$ in the communication control means TR in the other information processing apparatuses which have received the transmission request signal SEQ interpret the signal SEQ and simultaneously therewith compare the address attached to the signal with their own address. When the two addresses coincide, the reception control device $C_1$ operates as indicated by the signal SEQ. That is, the device $C_1$ surveys the existence or nonexistence of data in the received data buffer register $RD_2$ from the condition of the data existence indicating signal $S_{11}$. The received data buffer register $RD_2$ temporarily stores data received and transfers the data under the control of the reception control device $C_1$ to the information processing portion A through the data line $D_5$. When data is stored in the buffer register $RD_2$, the latter delivers the signal $S_{11}$ in the "1" state, and when no data is stored, it delivers the signal $S_{11}$ in the "0" state.

When the signal $S_{11}$ is in "0" state indicating a vacancy of the buffer register $RD_2$, the reception control device $C_1$ sends out a response instruction signal $S_4$ in "1" state to the transmission control device $C_2$, and when the signal $S_{11}$ is in "1" state indicating the buffer register $RD_2$ is not vacant, the device $C_1$ sends out the response instruction signal $S_4$ in "0" state to the transmission control device $C_2$. The transmission control device $C_2$ generates a reception ready response signal ACK when the signal $S_4$ is "1", and a reception not ready response signal NAK when the signal $S_4$ is "0", and sends the signal ACK or NAK to the transmission register $SD_1$. The transmitter SED sends out the response signal ACK or NAK over the transmission bus line CL to the source of the transmission request signal SEQ, that is, the apparatus now establishing command over the bus line CL.

In the information processing apparatus now establishing command, when the communication control means TR interprets that the response signal sent from the communication control means in the destined apparatus is the reception ready signal ACK, the reception control device $C_1$ delivers a data transmission instruction signal $S_5$ to the transmission control device $C_2$ in the same TR. The transmission control device $C_2$ thus reads out the data attached with the address of the destination apparatus stored in the buffer register $SD_2$, and sends the data to the transmission register $SD_1$. The transmitter SED in turn sends out the data attached with the address of the destination over the bus line CL.

In the communication control TR of the destination apparatus, the data thus transmitted over the bus line CL is received through the receiver RED and reception register $RD_1$. When the reception control device $C_1$ judges that the address attached to the data now received coincides with its own address, the data in the reception register $RD_1$ is transferred through the data line $D_2$ to the reception buffer register $RD_2$. When a data transmission termination signal ETX from the transmitting apparatus is received in the TR of the destination apparatus, the reception control device $C_1$ carries out error check on the data stored in the buffer register $RD_2$, and depending on whether error is found or not found, the control device $C_1$ delivers a reception response instruction signal $S_6$ in "0" or "1" state, respectively, toward the transmission control device $C_2$. The device $C_2$ thus sends out through the transmitter SED a reception completion signal RAK when the instruction signal $S_6$ is in "1" state, and a reception incorrect signal RNK when the instruction signal $S_6$ is in "0" state, over the transmission bus line CL.

When the communication control TR in the information processing apparatus now establishing command receives the reception completion signal RAK or the reception incorrect signal RNK sent from the TR of the destination apparatus after the former control TR has transmitted the data, it operates as follows. The reception control device $C_1$ in the communication control TR interprets the content of the signal received through the receiver RED and stored in the reception register $RD_1$, and if it finds out that the signal is the reception completion signal RAK, a transmission completion instruction signals $S_7$ is sent from the device $C_1$ to the transmission control device $C_2$. The transmission control device $C_2$ thus detects that the series of data transmission has terminated, and sends out a reset signal $S_{12}$ to the transmission buffer register $SD_2$ to reset the same, and also another reset signal $S_8$ to the command establishing device M to reset the same device for releasing the establishment of the command. Simultaneous therewith, the transmission control device $C_2$ delivers a command establishing signal ELS attached with an address beforehand set in the subsequent address setting device $AD_2$ to be sent out through the transmitter SED over the transmission bus line CL.

On the contrary, when the reception control device $C_1$ judges that the content of the response signal is the reception incorrect signal RNK, the reception control device $C_1$ delivers the data transmission instruction signal $S_5$ toward the transmission control device $C_2$. The transmission control device $C_2$ thus reads out the data stored in the transmission buffer register $SD_2$ and carries out the retransmission of the same data. In the case where the reception completion signal RAK cannot be obtained from the destination apparatus even after repetition of the retransmission procedure for a predetermined number of times, the transmission control device $C_2$ sends a signal $C_1$ to the information processing portion A thereby to inform the portion A of the fact that the transmission of the data was unsuccessful, and also sends a reset signal $S_8$ to the command establishing register M to release the establishment of the command. Simultaneous therewith, the transmission control device $C_2$ generates a command establishing signal ELS and attaches thereto an address beforehand set in the subsequent address setting device $AD_2$ and sends out the resultant signal through the transmitter SED to the transmission bus line CL.

The communication control means TR operates as described during the period from the establishment of the command to the release of the same. In the case where command is established in the communication control means TR but the information processing portion A has no demand to transmit data, and in the case where after transmission of the transmission request signal SEQ a reception not ready signal NAK is received from the destination apparatus, the reception control device $C_1$ in the communication control TR immediately delivers a command releasing signal $S_3$ to the command establishing register M. The command is thus released and transferred to the subsequent information processing apparatus as described hereinbefore. Furthermore, the communication control may be so constructed that when it receives a data reception request signal REQ from the communication control TR of other information processing apparatus establishing command, it reads out the data stored in the transmission data buffer register $SD_2$ and sends the data toward the communication control TR of the information processing apparatus now establishing command. When so constructed, the communication control TR of an information processing apparatus establishing command can operate in both of requesting data transmission to any other apparatus and requesting data reception from any other apparatus.

The communication control TR of an information processing apparatus thus aquires the command by the command transferring action of the information processing apparatus establishing command, and once the first information processing apparatus aquires the command, it can operate actively in requesting other apparatus to transmit and receive data. When there is no demand to transmit or receive data in its own apparatus or when a series of data transmission operations based on the demand has terminated, the communication control means TR operates immediately in transferring the command to another information processing apparatus in a predetermined sequence. Thus it is apparent that every individual information processing apparatus indicated in FIG. 2 can transmit its data under the above described operation of the communication control of the apparatus with the command over the transmission bus line transferred in a predetermined sequence.

All the above described operations of the information processing apparatuses are based on the assumption that the communication control of each information processing apparatus has no fault and therefore can operate normally. However, if a fault occurs in any of the communication control means of these apparatuses, there is a possibility of the command transferring action becoming impossible, as will be mentioned below.

Firstly, when a fault occurs in the communication control of an information processing apparatus presently in command, the command transferring signal SEL for transferring the command to the subsequent apparatus cannot be issued from the faulty communication control which makes it impossible to transfer the command. Secondly, when a fault occurs in the communication control means in the information processing apparatus to which the command is to be transferred, the command establishing signal ELS will not be received and acted upon thus also making it impossible to transfer the command. When the transfer of command is made impossible as described above, the information processing apparatus having command disappears and the transmission of data between the information processing apparatuses is interrupted, thus causing the total failure of the system.

In order to prevent the total failure of the system caused by the faults in the communication controls of the information processing apparatuses, timers $T_1$ and $T_2$ constituting a watch mechanism are provided as shown in FIG. 4 in the communication control means.

The timer $T_1$ in the communication control TR is set to a time length $Ta$ slightly longer than that of one word or one block of words used in each of the information processing apparatuses. The time length $Ta$ is varied depending on the priority for transferring the command to the information processing apparatus. More specifically, the time length $Ta$ is made shorter when the command transferring priority of the given information processing apparatus is high. The timer $T_1$ is started by $S_1$ or $S_3$. After the termination of the time length $Ta$ of the timer $T_1$, a signal $ST_1$ is delivered from the timer $T_1$. However, the timer $T_1$ may be restarted before the termination of the time period $Ta$ if a reset or restart signal is applied thereto, and in this case the time counting operation of the timer $T_1$ is restarted from zero. The $S_1$ delivered from the reception control device $C_1$ when it receives command transferring signal SEL destined for itself and the signal $S_3$ also delivered from the reception control device $C_1$ when the latter receives a command establishing signal ELS from any other apparatus are used for the timer reset signal. The output signal $ST_1$ from the timer $T_1$ is applied to the command establishing device M as a set signal.

On the other hand, the timer $T_2$ is set to have a time length $Tb$ slightly longer than that required for receiving the command establishing signal ELS from another information processing apparatus after the command transferring signal SEL has been sent. The timer $T_2$ operates in such a manner that it starts its time counting operation from the instant when the transmission control device $C_2$ delivers a timer set signal $S_9$ simultaneous with the delivery of the command transferring signal SEL. It delivers a time output signal $ST_2$ at the termination of the preset time length $Tb$. However, if the timer $T_2$ receives a reset signal from the reception control device $C_1$ during its time counting operation, the timer $T_2$ is reset thereby to stop the time counting operation. The output signal $ST_2$ from the timer $T_2$ is applied to the transmission control device $C_2$ as an instruction signal for the jumped transfer of the command. When the transmission control device $C_2$ receives the signal $ST_2$ from the timer $T_2$, it operates to transmit a command transferring signal SEL attached with an address beforehand set in the subsequent address setting device $AD_2$ plus one.

When all the communication controls of the information processing apparatuses are operating in normal manner, the reception control device $C_1$ in the communication control of each of the information processing apparatuses receives the command transferring signal SEL or the command establishing signal ELS within a shorter period than the time period $Ta$ set in the timer $T_1$, a reset signal $S_3$ or a set signal $S_1$ for the command establishing device M is delivered in correspondence therewith, and either one of the signals is applied to the reset input of the timer $T_1$, whereby the timer $T_1$ has no possibility of generating the output signal $ST_1$, and the command establishing device M is never set by the timer $T_1$.

However, if a fault occurs in the communication control means TR of the information processing apparatus now establishing command, and no command transferring signal SEL is delivered from the communication control TR toward the information processing apparatus to which the command is to be transferred subsequently within the due time, no command transferring signal is emitted from any of the information processing apparatuses. In this situation, timers $T_1$ in the communication controls TR of the information processing apparatuses successively arrive at the ends of their time periods $Ta$ set therein. However, the timer within the communication control TR of an information processing apparatus having the highest priority delivers firstly the output signal $ST_1$ and the command establishing device M in the communication control TR is thereby set to establish command by the same information processing apparatus. Thus the command establishing signal ELS is immediately delivered from the communication control means of the same information processing apparatus, and since the communication control means of other information processing apparatuses receive the command establishing signal ELS before the termination of the time periods $Ta$ set in their timers $T_1$, the timer $T_1$ in these communication control means are all reset. Thus it is apparent that when the transfer of command becomes impossible by a fault in the communication control TR in the information apparatus now establishing command, the command is automatically transferred to one of the normally operating information processing apparatuses having the highest priority, the subsequent operations being carried out as described hereinbefore.

When a fault occurs in the communication control TR in an information processing apparatus to which command is subsequently to be transferred, command is transferred jumping over the faulty communication control means TR to another information processing apparatus to which the command is to be transferred. That is, in the communication control means TR which delivers the command transferring signal SEL to the information processing apparatus set in the subsequent address setting device $AD_2$, the transmission control device $C_2$ delivers simultaneous therewith a set signal $S_9$ to the timer $T_2$ thereby to set the timer into its time counting operation. If no signal for establishing command ELS is received in the communication control means TR from the information processing apparatus set in the subsequent address setting device $AD_2$ because of a fault in the communication control means TR of the latter apparatus within the time period $Tb$, the timer $T_2$ will deliver an output signal $ST_2$ to the transmission control device $C_2$. Upon reception of the signal $ST_2$, the transmission control device $C_2$ adds one to the address set in the subsequent address setting device $AD_2$, and acts to transmit again another command transferring signal SEL attached with the address thus added with one over the transmission bus line CL, thereby to transfer command in jumping over the information processing apparatus set in the subsequent address setting device $AD_2$ to the second subsequent information processing apparatus. Thus, it is apparent that even in the case of a fault in the communication control means TR to which the command is to be transferred, command is transferred by the operation of the timer $T_2$ in jumping manner to the second subsequent information processing apparatus without causing any interruption of the data transmission.

The data transferring operation between the communication control means TR and the information processing portion A, both included in the same information processing apparatus, will now be described somewhat in detail.

In the data transmitting operation, the information processing portion A detects a signal $G_2$ indicating the vacancy of the buffer register $SD_2$, and when the signal $G_2$ is in the state showing the vacancy, the portion A sets the data into the transmission buffer register $SD_2$. The register $SD_2$ sends the signal $S_{10}$ in the state "1" showing the possession of data to the transmission control device $C_2$ when the data setting operation of the portion A terminates. The transmission control device $C_2$ sends a reset signal $S_{12}$ to the register $SD_2$ when the data transmission of the data set in the register $SD_2$ completes thereby to reset the buffer register $SD_2$ to prepare for the subsequent data.

In the data reception operation, when received data is taken into the reception buffer register $RD_2$, the register $RD_2$ sends out a reception completion signal $G_3$ to the information processing portion A. Upon reception of the signal $G_3$, the information processing portion A reads out the data through the data line $D_5$, and when the reading operation completes, the information processing portion A sends a reset signal $G_4$ to the buffer register $RD_2$ for preparing the register to store the subsequent data.

As will be apparent from the above description, according to this invention, a plurality of information processing apparatuses are connected in parallel with a commonly provided transmission bus line, and data are transmitted and received between these information processing apparatuses in a manner such that each of the information processing apparatuses sequentially establishes the command of the transmission bus line and carries out transmission of data with other information processing apparatuses. Thus, the requirement of a commonly provided bus line control device in the conventional arrangement is obviated and the cost for the entire information transmission system can be economized. Furthermore, when any fault occurs in the information processing apparatus, the command for the bus line is established in a manner jumping over the faulty information processing apparatus, and data can be transmitted and received between the remaining information processing apparatuses.

Although $C_1$ and $C_2$ are shown as single blocks, respectively, it will be appreciated by anyone of ordinary skill in the art that the latter the blocks may consist of several individual commonly used elements for carrying out the conventional functions ascribed to $C_1$ and $C_2$, e.g. decoding a given signal and outputing a certain S pulse in response thereto, responding to a given S pulse by generating a preset pulse code, etc.

What is claimed is:

1. In an information transmission network of the type comprising a plurality of information processing stations, each having a communications control means and an information processor, linked together by their parallel connection to an information bus line, a method of establishing orderly command over the utilization of said bus line without a special line controlling station, said method comprising,
    a. establishing at a given station $i$ command over the use of the bus line,
    b. transmitting to said bus line from said given station $i$ a command established signal ELS indicating that command is established and that said given station $i$ has command,
    c. receiving at all other stations said command established signal ELS,
    d. communicating data between said given station $i$ and any other station via said bus line,
    e. after said communication or where no communication is required by station $i$, relinquishing command and sending a transfer command signal SEL having a selected address $m$ attached thereto to said bus line,
    f. receiving at all stations said transfer command signal SEL, and at the station having address $m$ establishing command over the bus line, and
    g. repeating steps (b) thru (e) with station $m$ being the command station, whereby command is continuously transferred from one station to the next to give all stations command of the bus line consecutively.

2. The method of claim 1 further comprising a method of detecting failure at the station presently commanding the bus line, said method of detectng comprising,
    a. monitoring at each station the SEL and ELS signals on the bus line,
    b. noting the absence of either of said latter signals for a first predetermined period of time longer than that required for any station to take command, communicate with another station and relinquish command; said predetermined period being different at each station,
    c. establishing command and sending to the bus line an ELS signal at the station where the said first predetermined period has been exceeded.

3. The method of claim 2 further comprising a method of detecting failure at the station to which command is to be transferred, said method comprising the steps of,
    a. starting a timer at the station presently in command when said station presently in command send a transfer command signal SEL with the address of the transfer station to the bus line,
    b. stopping said timer upon receipt of a signal ELS via the bus line,
    c. after a second predetermined time, longer than that required to send an SEL signal and receive an ELS signal, during which no ELS signal has been received at the station transferring command, retransmitting a transfer command SEL with the address of a different station to the bus line.

4. The method of claim 1 further comprising a method of detecting failure at the station to which command is to be transferred, said method comprising the steps of,
    a. starting a timer at the station presently in command when said station presently in command sends a transfer command signal SEL with the address of the transferee station to the bus line,
    b. stopping said timer upon receipt of a signal ELS via the bus line,
    c. after a second predetermined time, longer than that required to send an SEL signal and receive an ELS signal, during which no ELS signal has been received at the station transferring command, retransmitting a transfer command SEL with the address of a different station to the bus line.

* * * * *